(12) United States Patent
Nishida et al.

(10) Patent No.: US 8,264,643 B2
(45) Date of Patent: Sep. 11, 2012

(54) ACTIVE MATRIX TYPE LIQUID CRYSTAL DISPLAY DEVICE AND MANUFACTURING PROCESS FOR THE SAME

(75) Inventors: Shinichi Nishida, Kanagawa (JP); Hideki Itou, Kanagawa (JP); Teruaki Suzuki, Kanagawa (JP); Sounosuke Takahashi, Kanagawa (JP); Yoshikazu Sakaguchi, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 634 days.

(21) Appl. No.: 12/353,649

(22) Filed: Jan. 14, 2009

(65) Prior Publication Data
US 2009/0185115 A1  Jul. 23, 2009

(30) Foreign Application Priority Data

Jan. 21, 2008 (JP) ................................ 2008-010869
Dec. 18, 2008 (JP) ................................ 2008-322092

(51) Int. Cl.
G02F 1/1335 (2006.01)
G02F 1/1343 (2006.01)

(52) U.S. Cl. ..................... 349/106; 349/110; 349/139

(58) Field of Classification Search .................. 349/106, 349/110, 139, 153; 359/890, 891; 345/88
See application file for complete search history.

(56) References Cited

U.S. PATENT DOCUMENTS

| | | | |
|---|---|---|---|
| 2004/0245551 A1* | 12/2004 | Murade | 257/222 |
| 2005/0213017 A1* | 9/2005 | Yamaguchi et al. | 349/153 |
| 2007/0281223 A1* | 12/2007 | Mochizuki | 430/5 |

FOREIGN PATENT DOCUMENTS

| | | | |
|---|---|---|---|
| JP | 62-262827 | * | 11/1987 |
| JP | 9-127547 | A | 5/1997 |
| JP | 2000-29014 | A | 1/2000 |
| JP | 2003-14917 | A | 1/2003 |
| JP | 2007-121326 | A | 5/2007 |

OTHER PUBLICATIONS

Chinese Office Action for corresponding Chinese patent application No. 200910005081.3 mailed Sep. 30, 2011.

* cited by examiner

Primary Examiner — Dung Nguyen
Assistant Examiner — Tai Duong
(74) Attorney, Agent, or Firm — Sughrue Mion, PLLC

(57) ABSTRACT

An active matrix liquid crystal display device of the invention includes a liquid crystal display panel operating in a normally black mode having a first substrate provided with a color filter and a second substrate provided with an active matrix array, wherein the first substrate is provided with a laminated colored layer with three colors, a laminated colored layer with two colors and a colored layer with one color in a frame part surrounding a display area without being provided with a black matrix, and the second substrate is provided with a conductive film formed in a region which is opposed to the laminated colored layer with two colors and the colored layer with one color, between the display area and the laminated colored layer with three colors.

2 Claims, 5 Drawing Sheets

ACTIVE MATRIX TYPE LIQUID CRYSTAL DISPLAY DEVICE AND MANUFACTURING PROCESS FOR THE SAME

INCORPORATION BY REFERENCE

This application is based upon and claims the benefit of priority from Japanese Patent Application No. 2008-010869, filed on Jan. 21, 2008, and No. 2008-322092, filed on Dec. 18, 2008, the disclosure of which is incorporated herein in its entirety by reference.

BACKGROUND OF THE INVENTION

1. Technical Field

The present invention relates to an active matrix liquid crystal display (LCD) device and a manufacturing process for the same and in particular, relates to an active matrix liquid crystal display device with a light-shielding structure formed by laminating color layers instead of a black matrix and a manufacturing process for the same.

2. Background Art

In recent years, it is strongly required that an active matrix LCD device with a high display quality can be obtained at smaller cost.

In a related LCD device, in order to shield a light entered from a frame part, a light shielding layer called a black matrix (BM) is formed on a substrate having a color filter (color filter substrate). This blackmatrix consists of a metal such as a chrome (chrome oxide) or a resin or the like. However, in order to decrease manufacturing costs, a technology for omitting the black matrix is proposed. For example, an LCD device which has a light shielding layer on a frame part surrounding a display area is disclosed in Japanese Patent Application Laid-Open No. 2000-29014 and Japanese Patent Application Laid-Open No. 2003-14917. The light shielding layer is formed by laminating colored layers which consist of at least two colors out of the plural colors.

FIG. 5 shows an outside plan view of a panel in a related common LCD device. FIG. 6 is a cross-sectional view along the VI-VI line in FIG. 5 and shows a structure of the LCD device having a black matrix. On the other hand, FIG. 7 shows the structure of a color filter substrate of the related LCD device where the black matrix is omitted, and FIG. 7 is also a cross-sectional view along the VI-VI line in FIG. 5.

As shown in FIG. 5, the related LCD device includes a display area 1 where a pixel is formed and a frame part 2 which surrounds the display area 1. As shown in FIG. 6, in order to hide wirings which are formed on an array substrate 30A and are drawn out from the display area 1, a black matrix 25 is formed on the frame part 2 of a color filter substrate 20A in which a color filter is formed. In this structure, the frame part 2 around the display area 1 is shielded from a light by the blackmatrix 25. Therefore, even though an electric field is applied between the wirings, deterioration of the display quality in the frame part 2 because of the light transmitted through this part does not arise.

On the other hand, as shown in FIG. 7, a color filter substrate 20B is not provided with a black matrix, but a light shielding structure is formed by laminating two or more colored layers. That is, the frame part 2 is shielded from a light by laminated structure composed of the same colored layers as those of the display area 1 (for example, red (R) colored layer 21, green (G) colored layer 22, and blue (B) colored layer 23).

SUMMARY

An exemplary object of the invention is to provide an active matrix type LCD device in which a frame part is sure to be shielded from a light by a laminated structure of colored layers instead of a black matrix and whose development costs can be reduced.

An active matrix LCD device according to an exemplary aspect of the invention includes a liquid crystal display panel operating in a normally black mode having a first substrate provided with a color filter and a second substrate provided with an active matrix array, wherein the first substrate is provided with a laminated colored layer with three colors, a laminated colored layer with two colors and a colored layer with one color in a frame part surrounding a display area without being provided with a black matrix, and the second substrate is provided with a conductive film formed in a region which is opposed to the laminated colored layer with two colors and the colored layer with one color, between the display area and the laminated colored layer with three colors.

An active matrix LCD device according to another exemplary aspect of the invention includes a liquid crystal display panel operating in a normally black mode having a first substrate provided with a color filter and a second substrate provided with an active matrix array, wherein the first substrate is provided with a laminated colored layer with three colors, a laminated colored layer with two colors, and a colored layer with one color in a frame part surrounding a display area without being provided with a black matrix, and the second substrate is provided with a conductive film formed in a region which is opposed to a boundary part between the display area and the colored layer with one color, and a boundary part between the laminated colored layer with three colors and the laminated colored layer with two colors.

A manufacturing process of an active matrix LCD device according to an exemplary aspect of the invention includes the steps of forming a color filter substrate by means of forming a first colored layer using a lithography process with an exposure mask, forming a second color layer using a lithography process with a mask having a same pattern as the exposure mask, and forming a third colored layer using a lithography process with a mask having a same pattern as the exposure mask, forming a conductive film in a region on an array substrate which is opposed to a colored layer with one color and a laminated colored layer with two colors which are located in an outer circumference of a display area on the color filter substrate, sticking the color filter substrate on the array substrate, and sealing a liquid crystal inserted therebetween.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

A FIRST EXAMPLE

An active matrix type liquid crystal display (LCD) device according to a first example of the present invention is provided with a liquid crystal layer which operates by a normally black mode, and has a structure of a frame part which includes colored layers. The colored layers in the frame part consist of at least two colors among three colors of R, G, and B which are formed by shift exposure using a same mask. A transparent electrode is arranged covering a region on an array substrate which is opposed to a colored layer part where a colored layer consisting of only one color or two kinds of color is formed in a region between a display area and a colored layer consisting of three kinds of color.

According to such structure, an electric field is not applied to a liquid crystal in the colored layer part in the frame part consisting of one color or two kinds of color, so normally black mode of an LCD panel is maintained. Therefore, the light transmitted through this region hardly arises, and good display quality can be secured. Even though a light enters this region from outside, since reflection of light hardly arises in this region, display quality can be kept excellent.

Common electrode potential is desirably applied to the transparent electrode or an opaque electrode formed in this region. Thereby, since the liquid crystal of this region is further stabilized, light leakage is further suppressed and the display quality of the frame part can be kept more excellent.

Figure 1:
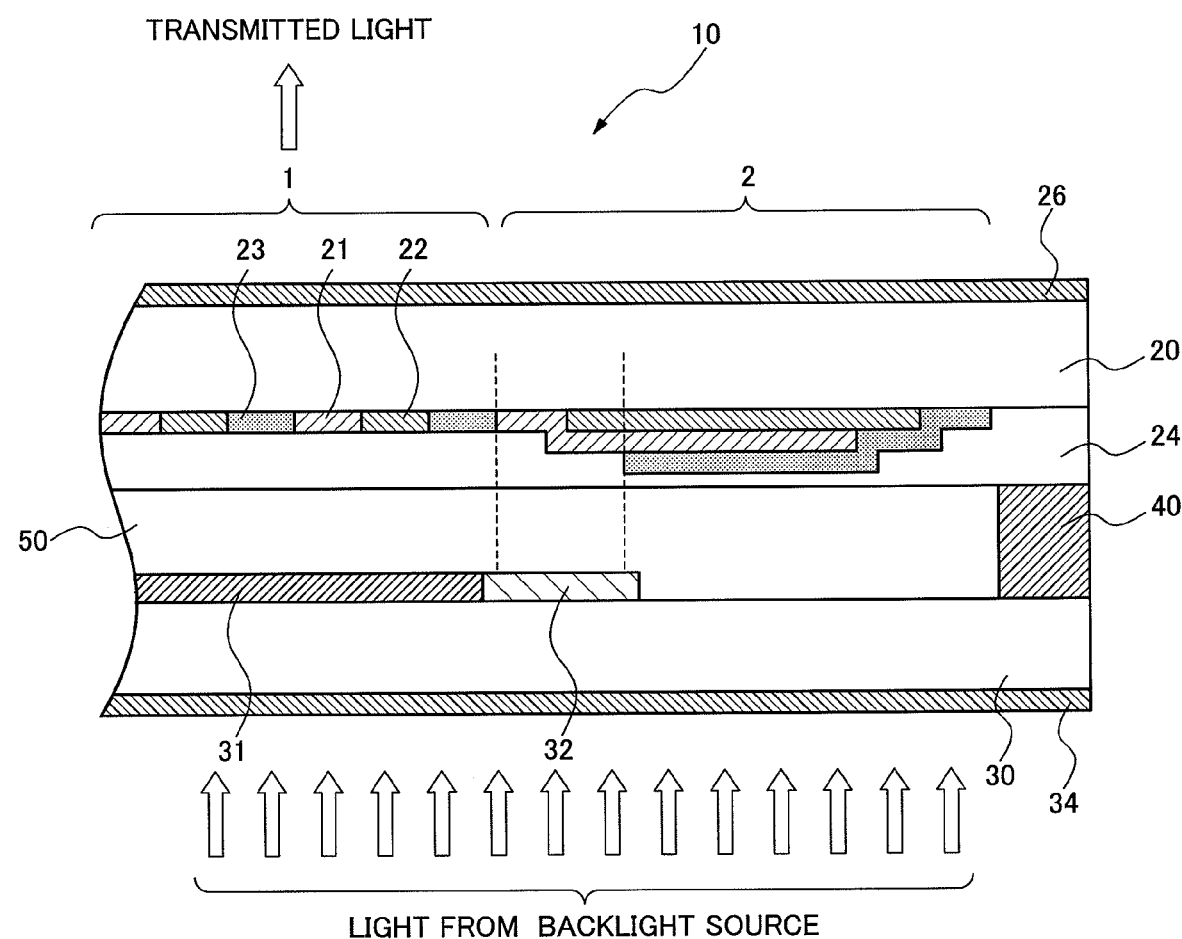
FIG. 1 is a cross-sectional view showing a structure near a frame part of an active matrix type LCD device of a first example of the present invention.

Next, the first example of the present invention is described in detail using a drawing. FIG. 1 is a cross-sectional view showing schematically a structure near the frame part of the active matrix type LCD device according to this example.

As shown in FIG. 1, an LCD device 10 according to this example has an array substrate 30, a color filter substrate 20 which is opposed to the array substrate 30, a liquid crystal layer 50 inserted between the both substrates, and a seal 40 which joins both substrates and seals the liquid crystal layer 50. The array substrate 30 has an array pattern 31 in which pixels having switching elements such as TFTs (thin film transistors) are arranged in a matrix shape. A colored layer corresponding to each color is arranged in a display area 1 of the color filter substrate 20 opposed to each pixel of the array substrate 30. One or more color layers are formed in the frame part 2 around the display area 1, and an overcoat layer 24 is formed so that these color layers can be covered. Polarizing plates 26 and 34 are arranged on the face of the array substrate 30 and the color filter substrate 20 on the opposite side of the liquid crystal layer 50, respectively.

Here, in this example, each colored layer is formed by exposure process using a common mask for each color of R, G, and B. That is, for example, the same mask is used for forming the colored layer of R and B respectively as is used for forming the colored layer of G. The mask consists of a pattern for a colored layer in the display area and a pattern for a colored layer in the frame part. In this case, in the display area 1, an exposure process is performed by means of shifting the mask by one pixel size for every colored layer. At that time, since each colored layer pattern corresponding to the frame part 2 is also formed by means of shifting the same mask, each colored layer pattern of R, G, and B in the frame part 2 is not uniform at its edge and is formed shifted by one pixel. As a result, as shown in FIG. 1, a main region except both edge regions in the frame part 2 consists of two or more colored layers (in this example, three colored layers 21-23 for three colors of RGB). This part has a high light shield effect, and this region becomes an achromatic color, therefore this part functions as a substitution of a black matrix perfectly. On the other hand, in the both edge regions of the frame part 2, the region which consists of a colored layer with only one color or overlapping colored layers with different two colors respectively is formed. That is, in the frame part 2, the colored layers which consist of two layers with two colors respectively (for example, R and G, or G and B) is formed so that the main region where the colored layers consist of three layers with three colors may be surrounded therewith, and the colored layer which consists of one layer with only one color of R or B is formed so that the colored layers with two colors may be surrounded therewith.

Generally, the laminated part of the colored layer with one color or two colors does not have light shield effect enough. Therefore, when an electric field arises in the array substrate 30 side, the liquid crystal moves in the region and the view of the motion can be visually recognized through the colored layer with one color or two colors. As a result, display quality is made lower.

However, in this example, in the region between the colored layer with three colors in the frame part 2 and the display area 1, a transparent electrode 32 is arranged covering the region on the array substrate 30 which is opposed to the colored layer with one color or two colors. Thereby, the electric field in peripheral regions can be prevented from entering into this region, and the normally black state of the liquid crystal is maintained because the polarizing plates 26 and 34 are formed also in the region corresponding to the transparent electrode 32. Therefore, also in the part where the colored layer with only one color or two colors is formed, the light transmitted through this region hardly arises and degradation of display quality can be prevented. Therefore, according to the LCD device of this example, a manufacturing cost can be reduced by using a common mask for RGB, and display quality can be kept excellent because the frame part is sure to be shielded from light.

If needed, this transparent electrode 32 may be electrically connected to a common electrode wiring on an LCD panel, and potential of the transparent electrode 32 may be made equal to that of the common electrode. Thereby, since the liquid crystal layer can be further stabilized, the light transmitted through the region in which the colored layer with only one color or two colors is formed can be prevented more certainly.

Next, a manufacturing process of the LCD device of the above-mentioned structure is described. First, a manufacturing process of the color filter substrate 20 is described.

Firstly, after applying the resist used as the colored layer of G, the G colored layer 22 is formed by performing exposure using the mask with a colored layer pattern of G for the display area 1 and a frame part pattern, and by developing and baking.

Next, the R colored layer 21 is formed by exposing the resist used as the colored layer of R with the same mask shifted leftward in FIG. 1 by one pixel, and by developing and baking.

The B colored layer 23 is formed by exposing the resist used as the colored layer of B with the same mask shifted rightward in FIG. 1 by one pixel, and by developing and baking. In this specification, each pixel for the R, G, or B is called one pixel.

The same mask is used in this example as mentioned above. However, in the case of forming a marker part, only when the resist for the G colored layers 22 as the first layer is exposed, the resist thereof is also exposed using the pattern for the marker. In the case of exposing second layer and third layer, the colored layer of the second layer and the third layer in the marker part is removed by shielding the part near the marker. By this process, in the display area 1 and near the edge of the frame part 2, the colored layer for RGB is formed shifted by one pixel size. On the other hand, in the marker part near surrounding area, only the marker of the first layer is formed and it has a completely different pattern. By adopting this structure, each colored layer for RGB can be formed with the same mask; and manufacturing costs can be reduced.

The thickness of each colored layer is determined so that a chromaticity range will be 40% on the condition of displaying. More specifically, the thickness of the R colored layer, the G colored layer, and the B colored layer is set at about 1.0 μm, respectively. When these three colored layers are piled up, transmission factor thereof is about 1% or less and the light shield effect is sufficient for a substitution of a black matrix.

Next, a transparent acrylic resin used as an overcoat layer is applied on this colored layer and is baked. Columnar spacers (not shown in FIG. 1) consisting of acrylic resin are formed on the overcoat layer. As a consequence of the above, the color filter substrate 20 is formed.

In this example, although the colored layers of three colors are laminated in order of G, R, and B respectively, the laminating order thereof can be changed. The columnar spacers may be formed in the array substrate 30 side. Spherical spacers may be applied instead of the columnar spacers.

Next, a manufacturing process of the array substrate 30 is explained. The manufacturing process of the array substrate 30 is the same as that of a conventional active matrix type array substrate using a-Si TFT as a switching element. For example, the array substrate 30 can be manufactured by the following processes.

First, a first metal layer (such as opaque metal) used as a scanning wiring and a common wiring is processed into a predetermined pattern. After a gate insulating film and a thin film semiconductor layer are formed, this thin film semiconductor layer is processed into an island-shaped part which is used as a switching element.

Next, a second metal layer used as a video signal wiring is processed into a predetermined pattern, and the contact layer in the island-shaped semiconductor layer is etched by using the wiring pattern.

After forming an insulating layer serving as a passivation layer, a through-hole for contact is formed. Next, a comb-tooth electrode which consists of a pixel electrode and a common electrode is formed by using an ITO (indium tin oxide) as a transparent conductive film. This pixel electrode is connected to a drain electrode of the TFT formed by the second metal layer, and the common electrode is connected to the common electrode wiring formed by the first metal layer.

Here, the region in the array substrate 30 which is opposed to the part of the colored layer with one color and the laminated part of the colored layers with two colors in the frame part 2 of the color filter substrate 20 is formed so that it may be covered by the ITO layer. If needed, the transparent electrode 32 formed by this ITO layer is connected to the common electrode wiring which consists of the first metal layer via a through-hole. Although the structure is shown in FIG. 1 where the transparent electrode 32 is formed so that it may be projected from the above-mentioned region, it is not limited to this structure and it is effective that the transparent electrode 32 may just cover the colored layer region with one color and the laminating region of the colored layers with two colors at least.

An alignment film is formed on the color filter substrate 20 and the array substrate 30 and rubbing treatment is performed in a predetermined direction. Then, the color filter substrate 20 and the array substrate 30 are stuck, and the liquid crystal is inserted in and sealed. The liquid crystal is homogeneously aligned, and polarizing plates are arranged with cross-Nicol relationship so that a normally black mode is obtained. In this example, an IPS (In-Plain Switching) mode LCD device is used which is driven by an electric field parallel to the substrate applied between the pixel electrode and the common electrode.

The LCD device according to the present invention is obtained by sticking polarizing plates on both sides and finally, connecting a predetermined circuit to this liquid crystal panel.

Thus, in the region on array substrate 30 which is opposed to the colored layer part with one color and the laminated part of the colored layers with two colors, the transparent electrode 32 is arranged so that this region can be covered. The potential on this transparent electrode 32 is fixed to common electrode potential if needed. Therefore, an electric field is not applied to the liquid crystal of this region. As a consequence, even though the mask used for forming each colored layer of RGB is shared, a normally black mode can be maintained. Therefore, the light transmitted through the frame part 2 hardly arises and the frame part 2 can be surely shielded from light.

Even though an opaque metallic layer is arranged instead of the transparent electrode 32, a normally black mode can be maintained because an electric field is not applied to the liquid crystal in the frame part 2. However, when an outside light enters through the color filter substrate 20, the light transmitted through the polarizing plate 26 in the color filter substrate 20 passes through the liquid crystal layer 50 in a polarization condition almost as it is, and is reflected with this opaque metal layer. Because this reflected light passes through the liquid crystal layer 50 with the polarization condition maintained and emits from the polarizing plate in the color filter substrate 20, a specific colored reflected light can be seen and the image quality is remarkably damaged. Therefore, in the LCD device of this example, it is desirable to arrange a layer consisting of the material with a low reflectance to visible light (for example, a transparent conductive film, such as an ITO).

The colored layer part with one color and the laminated part of the colored layers with two colors are formed in the shifted direction of the mask. And, in the direction which intersects perpendicularly with the shifted direction of the mask, the frame part 2 is provided only with the laminated colored layer with three kinds of colors. Therefore, the transparent electrode 32 needs not necessarily arranging to its direction. When the mask is slantingly shifted to the edge of the array substrate 30, the colored layer part with one color and the laminated colored layer with two colors are formed in the perimeter of the frame part 2, therefore, in this case, the transparent electrode 32 can be arranged in the perimeter of the frame part 2.

A SECOND EXAMPLE

An active matrix type liquid crystal display device according to a second example of the present invention is provided with a liquid crystal layer which operates by a normally black mode, and has a frame part including colored layers with at least two colors among three colors of R, G, and B which are formed by shifted exposure process with a same mask. In a region of an array substrate which is opposed to a boundary part between a colored layer part with one color or a laminated colored layer with two colors in a frame part and a display area, and a boundary part between the colored layer part with one color or the laminated colored layer with two colors in the frame part and a laminated colored layer with three colors in the frame part, a transparent electrode or opaque electrode which covers this boundary part at least is arranged.

Figure 2:
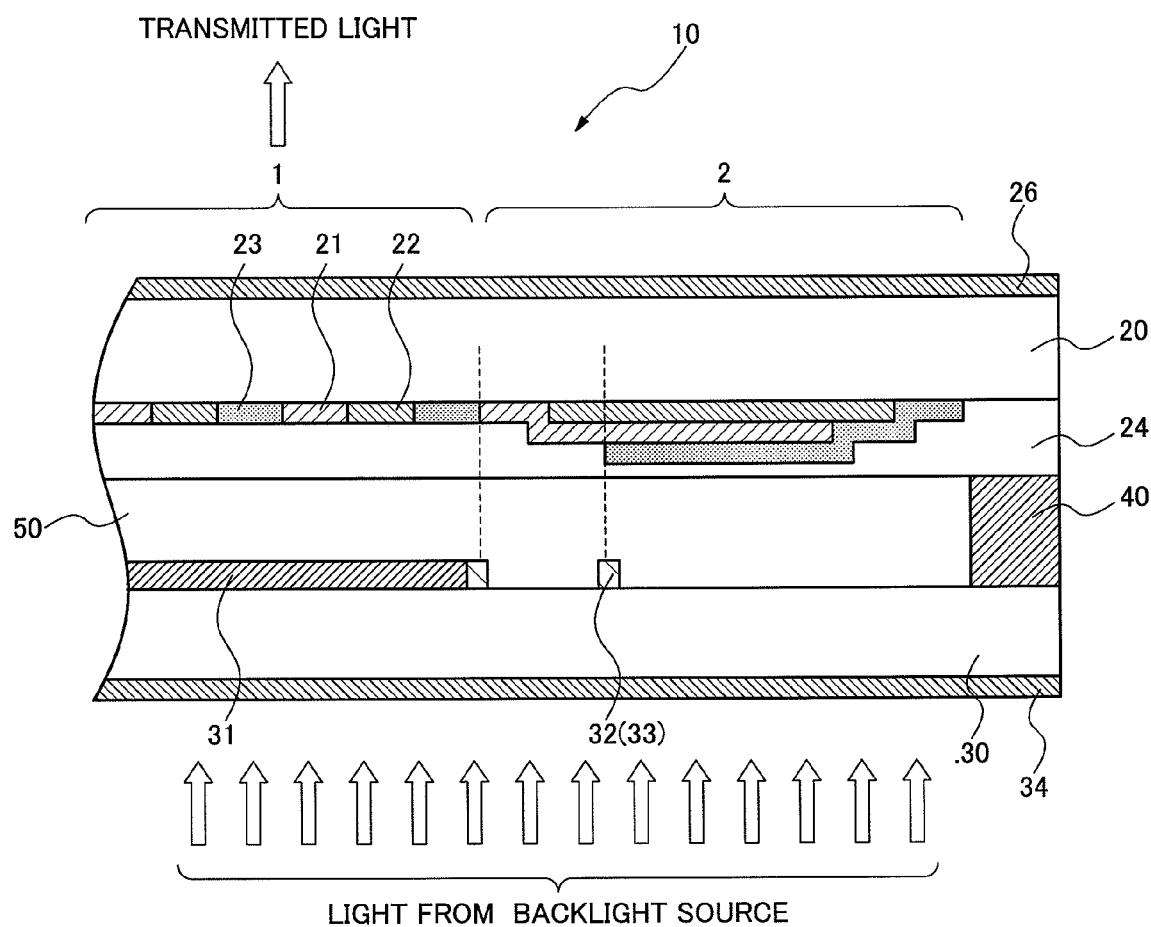
FIG. 2 is a cross-sectional view showing a structure near a frame part of an active matrix type LCD device of a second example of the present invention.

Next, the second example of the present invention is described in detail using a drawing. FIG. 2 is a cross-sectional view showing schematically a structure near the frame part of the active matrix LCD device according to this example, and FIG. 3 is a plan view looked from an upper part near the frame part.

A main region except both edge regions in the frame part 2 is provided with a three-layer laminated structure consisting of three colored layer with each layer having respectively one color among three colors of RGB, as well as the active matrix type LCD device according to the first example. This region functions as a substitution of a black matrix perfectly because transmission factor thereof is very small. On the other hand, a colored layer part with one color or overlapping colored layers with two colors are formed in the both edge regions of the frame part 2.

Generally, the colored layer part with one color or the laminated colored layer with two colors does not have light shield effect enough. Therefore, when an electric field arises in the array substrate 30 side, the liquid crystal moves in the region and the view of the motion can be visually recognized through the colored layer with one color or two colors. As a result, display quality is made lower.

Figure 3:
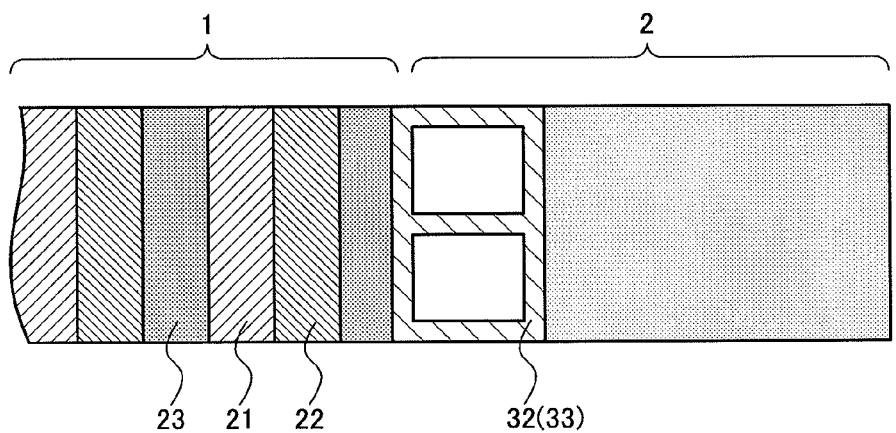
FIG. 3 is a plan view showing the structure near a frame part of the active matrix type LCD device of the second example of the present invention.

However, in this example, as shown in FIG. 2 and FIG. 3, a transparent electrode 32 is formed in a surrounding region of the colored layer part with one color, or the laminated colored layer with two colors. More specifically, a transparent electrode 32 is arranged in a region on the array substrate which is opposed to a boundary part in the frame part between a display area 1 and a colored layer part with one color or a laminated colored layer with two colors, and a boundary part in the frame part between a laminated colored layer with three colors and the colored layer part with one color or the laminated colored layer with two colors. The transparent electrode 32 can be arranged if needed also in a region which is opposed to a wiring (for example, a scanning wiring or a video signal wiring) with different potential from common electric potential. If needed, this transparent electrode 32 may be connected to the common electrode wiring, and the potential thereof may be fixed to the common electrode potential. The width of transparent electrode 32 is not limited in particular, and it should have width which covers at least the boundary part (and if required the above-mentioned wiring part).

By adopting the structure, an electric field is not applied to the liquid crystal in the region surrounded with the transparent electrode 32. Because polarizing plates 26 and 34 are formed also in the region corresponding to the transparent electrode 32, a normally black mode is maintained. Therefore, even though a mask for forming each colored layer of RGB is shared, a light cannot be transmitted through this region and the frame part 2 can be surely shielded.

In the first example, when the opaque metal layer is arranged instead of the transparent electrode, the outside light which enters through the color filter substrate 20 is reflected by this metal layer. As a result, the image quality is damaged.

In this example, in contrast to it, the area of the electrode in the frame part is small enough compared with that of the first example. Therefore, reflection of the outside light in this region hardly arises. Therefore, in this example, instead of the transparent electrode 32, an opaque electrode 33 can be used. The opaque electrode 33, for example, consists of the first metal layer used as a scanning line and common wiring, or the second metal layer used as a video signal wiring.

In this example, in the direction which intersects perpendicularly with the shifted direction of the mask, the frame part 2 is provided only with the laminated colored layer with three kinds of colors. Therefore, the transparent electrode 32 or the opaque electrode 33 needs not necessarily arranging to its direction. When the mask is slantingly shifted to the edge of the array substrate 30, the transparent electrode 32 or the opaque electrode 33 can be arranged in the perimeter of the frame part 2.

A THIRD EXAMPLE

Figure 4:
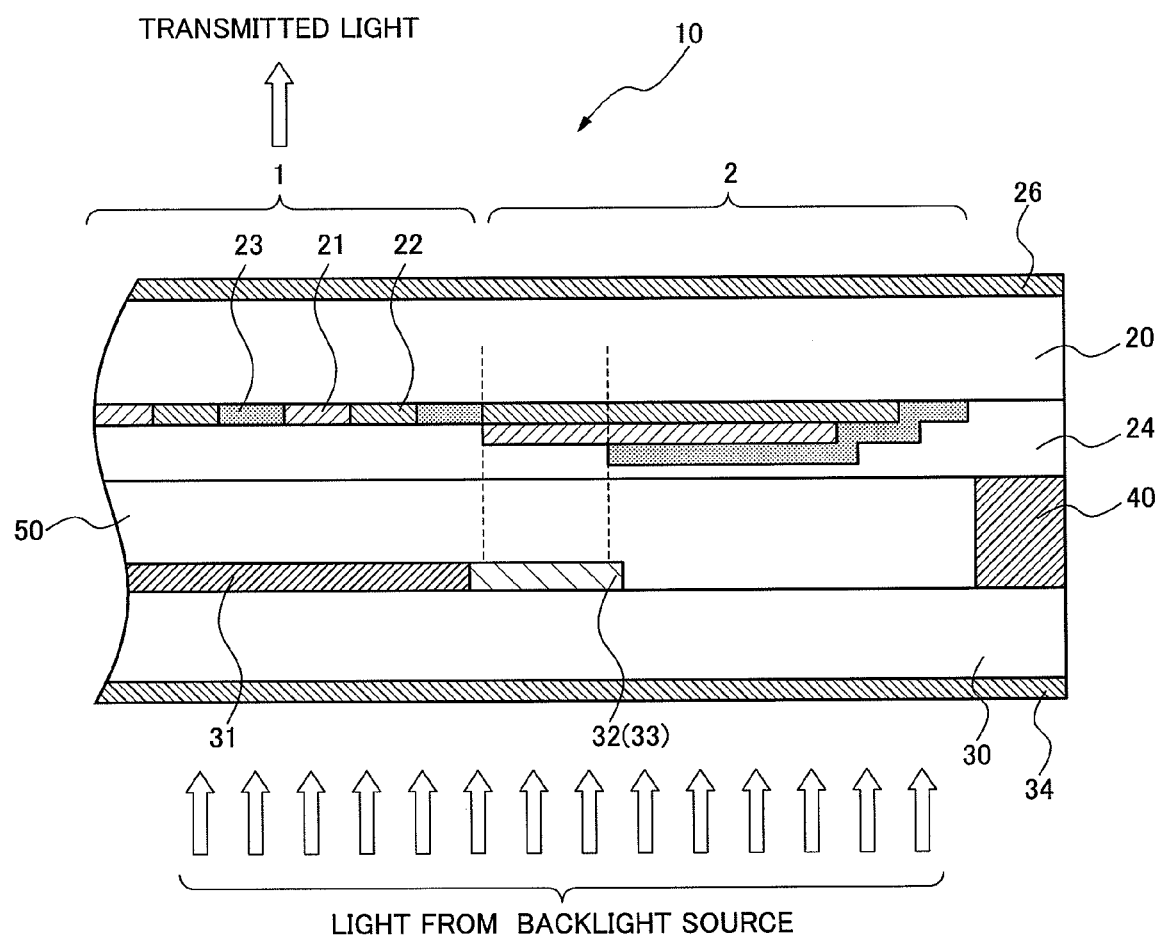
FIG. 4 is a cross-sectional view showing a structure near a frame part of an active matrix type LCD device of a third example of the present invention.
Figure 5:
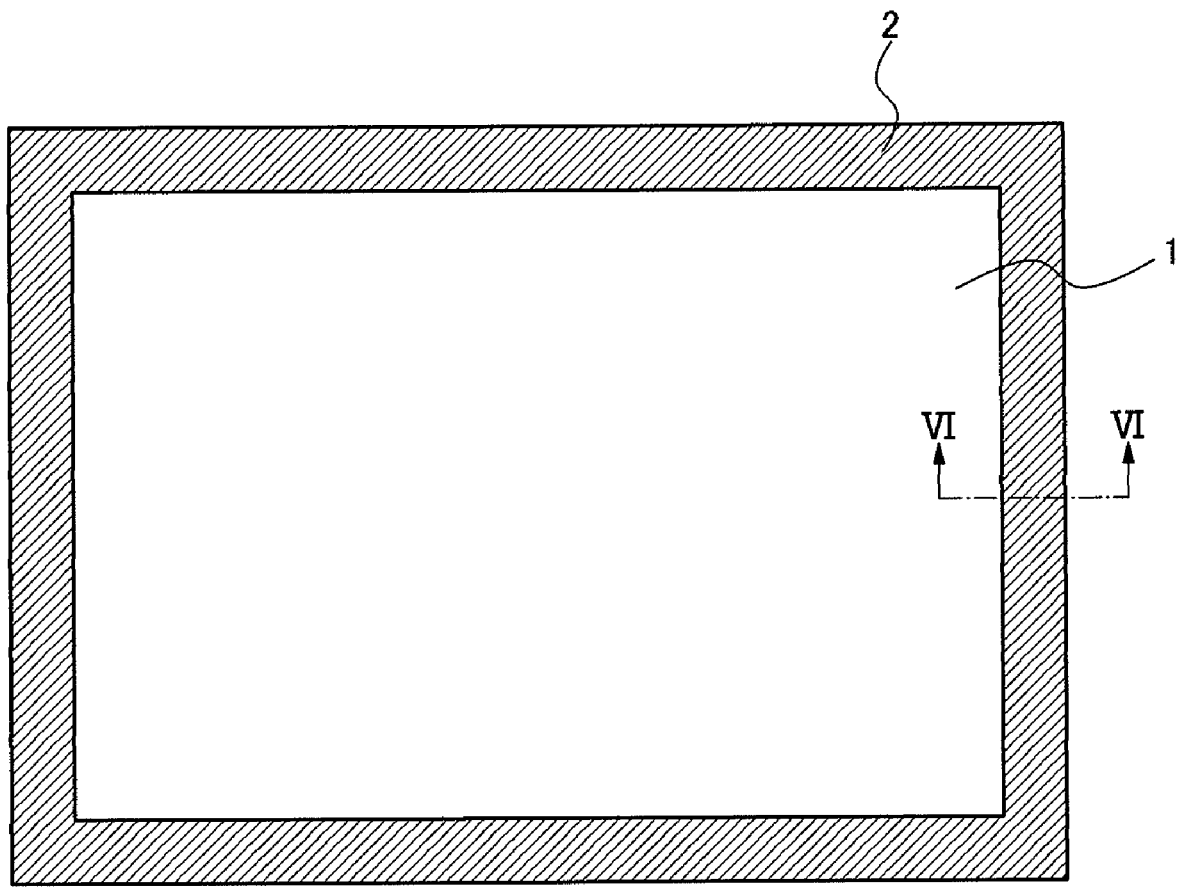
FIG. 5 is a plan view showing a structure of a related liquid crystal display panel.
Figure 6:
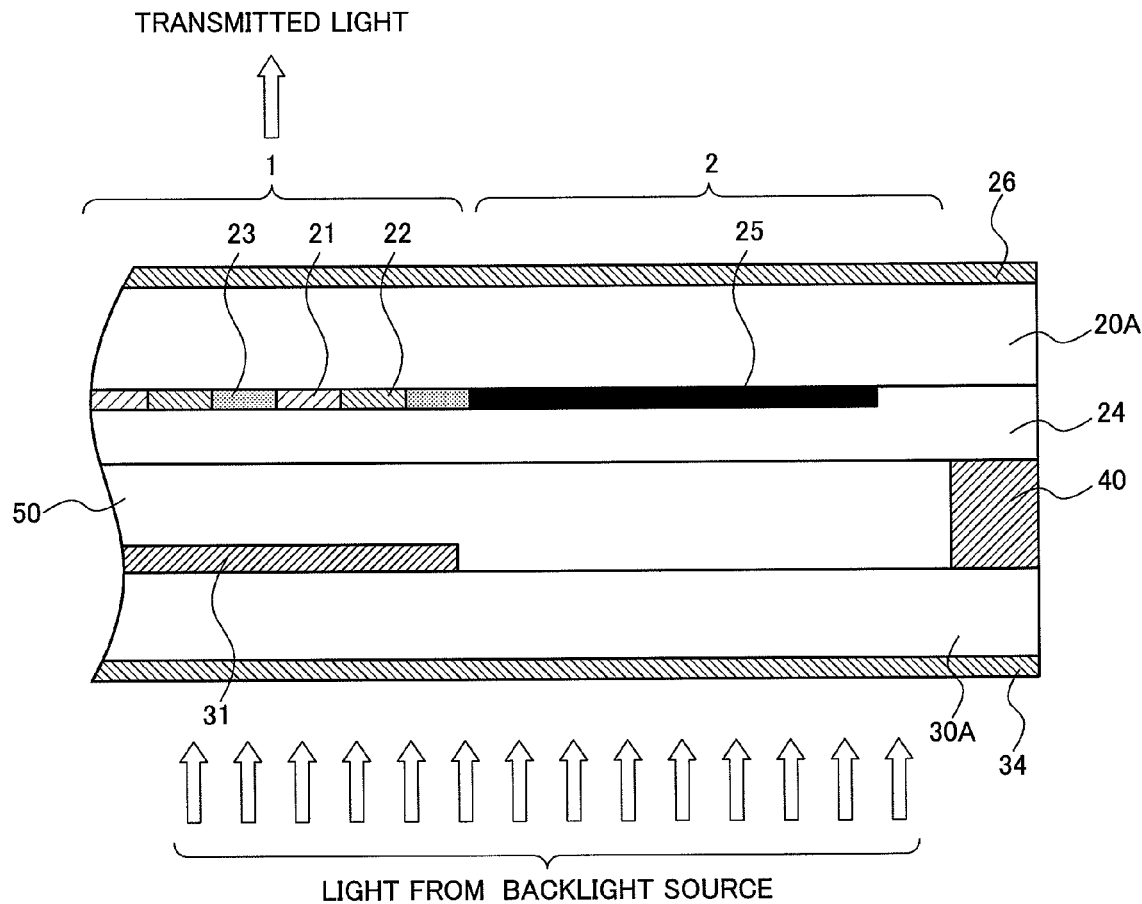
FIG. 6 is a cross-sectional view showing a structure near a frame part of a related active matrix type LCD device having a black matrix.
Figure 7:
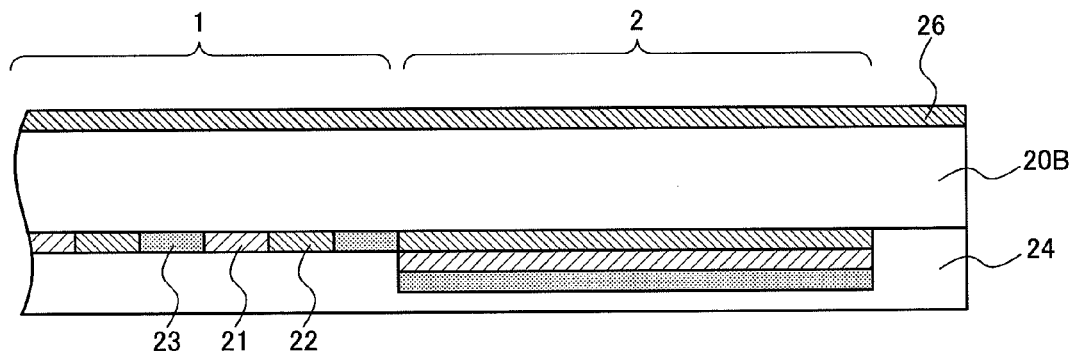
FIG. 7 is a cross-sectional view showing a structure near a frame part of a color filter substrate of a related active matrix type LCD device where a black matrix is omitted.

Next, an active matrix LCD device concerning according to a third example of the present invention is explained with reference to FIG. 4. FIG. 4 is a cross-sectional view showing schematically a structure near a frame part of an active matrix LCD device of this example.

As shown in FIG. 4, an LCD device 10 according to this example has an array substrate 30, a color filter substrate 20 which is opposed to the array substrate 30, a liquid crystal layer 50 inserted between the both substrates, and a seal 40 which joins both substrates and seals the liquid crystal layer 50 as well as the first example. The colored layer with each color which is opposed to each pixel of the array substrate 30 is arranged in a display area 1 in the color filter substrate 20. A color layer part with one layer or a laminated part with a plurality of color layers is formed in a frame part 2 surrounding the display area 1, and an overcoat layer 24 is formed so that these color layer parts may be covered. Polarizing plates 26 and 34 are arranged on the face of the array substrate 30 and the color filter substrate 20 on the opposite side of the liquid crystal layer 50, respectively.

Here, in this example, in forming the colored layer with each color, one mask for exposure process is shared to form the colored layers with two colors among the three colors of R, G, and B, and an another mask for exposure process is used to form the colored layer with the remaining one color. That is, in this example, one mask is used to expose the colored layer of G first, and the other mask is used to expose to the colored layer with the remaining colors of R and B.

Also in this example, a main region except both edge regions in the frame part 2 has laminated colored layer with three colors of RGB. This region functions as a substitution of a black matrix perfectly, because the light transmission factor in this region is very small.

On the other hand, as shown in FIG. 4, between the main region and the display area 1, the laminated colored layer with two colors of R and G is formed. The laminated colored layer with two colors of G and B and the colored layer with only one color of B are formed in the outer circumference area of the main region.

Generally, the laminated part of the colored layer with one color or two colors does not have light shield effect enough. Therefore, when an electric field arises in the array substrate 30 side, the liquid crystal moves in the region and the view of the motion can be visually recognized through the colored layer with one color or two colors. As a result, display quality is made lower.

However, in this example, in the region between the display area 1 and the laminated colored layer with three colors in frame part 2, a transparent electrode 32 is arranged covering the region on the array substrate 30 which is opposed to the laminated colored layer with two colors. Thereby, the electric field in peripheral regions can be prevented from entering into this region, and the normally black state of the liquid crystal is maintained because the polarizing plates 26 and 34 are formed also in the region corresponding to the transparent electrode 32. Therefore, also in the region where the colored layer with only one color or two colors is formed, the light transmitted through this region hardly arises and degradation of display quality can be prevented.

As mentioned above, according to this example, a manufacturing cost can be reduced by using a common mask for RGB, and display quality can be kept excellent because the frame part is sure to be shielded from light.

If needed, the transparent electrode 32 is electrically connected to the common electrode wiring on the LCD panel, and the potential thereof can be equal to the common electrode potential. Thereby, since the liquid crystal of this region is further stabilized, the light transmitted through the colored layer with one color or the colored layer with two colors is sure to be further suppressed.

Next, a manufacturing process of the LCD device according to this example is explained. First, a manufacturing process of the color filter substrate 20 is described.

After applying the resist used as the colored layer of G firstly, the G colored layer 22 is formed by exposing with the mask which contains a colored layer pattern of G in the display area 1 and a frame part pattern, and by developing and baking. Next, a resist used as the colored layer of R is exposed with a different mask from that used for the colored layer of G, and by developing and baking, the R colored layer 21 is formed. The resist used as the colored layer of B is exposed with the same mask used in forming the R colored layer 21 shifted rightward of FIG. 4 by two pixels, and by developing and baking, the B colored layer 23 is formed.

Here, a marker is formed in a mask for exposing the G colored layer, and a marker is not formed in a mask for the R colored layer and the B colored layer.

By the above-mentioned process, each colored layer of RGB has the structure shifted by pixel size in the display area 1, and, on the other hand, a completely different pattern is formed in a surrounding marker region. By adopting this structure, the R colored layer and the B colored layer can be formed with the same mask, therefore, manufacturing costs can be reduced.

The thickness of each colored layer is determined so that a chromaticity range will be 40% on the condition of displaying. More specifically, the thickness of the R colored layer, the G colored layer, and the B colored layer is set at about 1.0 µm, respectively. When these three colored layers are piled up, transmission factor thereof is about 1% or less and the light shield effect is sufficient for a substitution of a black matrix.

Next, a transparent acrylic resin used as an overcoat layer is applied on this colored layer and is baked. Columnar spacers consisting of acrylic resin are formed. As a consequence of the above, the color filter substrate 20 is formed.

In this example, although the colored layers of three colors are laminated in order of G, R, and B respectively, the laminating order thereof can be changed. The columnar spacers may be formed in the array substrate 30 side, and spherical spacers may be formed by a coating process instead of the columnar spacers.

The array substrate 30 is formed as well as that of the first example. An alignment film is formed on the color filter substrate 20 and the array substrate 30, respectively, and rubbing treatment is performed to each alignment film in the predetermined direction. Then, the color filter substrate 20 and the array substrate 30 are stuck, and a liquid crystal is inserted in and sealed. The LCD device according to this example is obtained by sticking polarizing plates on both sides and finally, connecting a predetermined circuit to this liquid crystal panel.

Thus, the transparent electrode 32 is arranged in the region on the array substrate 30 which is opposed to the laminated colored layer with two colors so that the whole surface of this region can be covered. Because this transparent electrode 32 is fixed to common electrode potential if needed, an electric field is not applied to the liquid crystal. As a consequence, even though some masks used for forming each colored layer of RGB are shared, a normally black mode can be maintained. Therefore, the light transmitted through the frame part 2 hardly arises and the frame part 2 can be surely shielded from light.

In the first example, when the opaque metal layer is arranged instead of the transparent electrode, the outside light which enters through the color filter substrate 20 is reflected by this metal layer. As a result, the display quality is damaged.

In contrast to it, according to this example, since the laminated colored layer with two colors are formed in this region, even though an outside light enters into this region, it is shielded by the laminated colored layer with two colors. Because reflected light hardly arises, there are no problems on display quality. Therefore, according to this example, both the transparent electrode 32 and the opaque electrode 33 can be used.

In this example, in the direction which intersects perpendicularly with the shifted direction of the mask, the frame part 2 is also provided only with the laminated colored layer with three kinds of colors. Therefore, the transparent electrode 32 or the opaque electrode 33 needs not necessarily arranging to its direction. When the mask is slantingly shifted to the edge of the array substrate 30, the transparent electrode 32 or the opaque electrode 33 can be arranged in the perimeter of the frame part 2.

In this example, as well as the first example, the transparent electrode 32 is arranged so that the whole surface of the region can be covered. However, the transparent electrode in the boundary region of the laminated colored layer according to the second example can be used with the color filter substrate 20 according to this example. That is, the transparent electrode 32 can be arranged in the region which is opposed to the boundary region between the laminated colored layer with two colors and the display area 1, or the laminated colored layer with three colors, and if needed, in the region which is opposed to a wiring region with potential different from common electric potential.

In above-mentioned examples, the colored layer pattern with three colors of RGB is described. However, colored layer pattern consisting of four or more colors can be used, and the trichromatic colored layer pattern consisting of colors other than RGB can be used similarly.

As disclosed in Japanese Patent Application Laid-Open No. 2000-29014 and Japanese Patent Application Laid-Open No. 2003-14917 which were described in the background art, the technology of forming a light-shielding structure by laminating a plurality of colored layers which constitute a color filter without using a black matrix layer is an effective process for cost reduction. However, in such related arts, because it is necessary to prepare a separate mask for each colored layer of RGB in order to form a satisfactory light-shielding structure in the frame part, there is a problem prevented from reducing manufacturing costs.

That is, in the related LCD device, a pattern of a display color is formed in an opening area of each pixel to control color of the display area 1. When forming each of these colored layer patterns by exposing and developing a photosensitive resist, a mask for exposure is needed. To form all the frame parts by piling up the colored layers with three colors, it is necessary to prepare the masks which consist of a display area pattern and a frame pattern corresponding to each colored layer of R, G, and B, respectively. That is, because the mask patterns for each colored layer of R, G, and B are different each other, three kinds of masks are needed.

Thus, in the related LCD device, because a mask which has a different pattern corresponding to each colored layer of R, G, and B, respectively must be used when a frame part is formed by piling up the colored layers of three colors, there is a problem of causing increase of development costs.

An exemplary advantage according to the present invention is that in the active matrix LCD device with the normally black mode without a black matrix layer, the frame part can be surely shielded from light, and the mask used in forming each colored layer of RGB can be shared.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. An active matrix liquid crystal display device comprising:
    a liquid crystal display panel operating in a normally black mode including a first substrate provided with a color filter and a second substrate provided with an active matrix array,
    wherein said first substrate is provided with a laminated colored layer with three colors, a laminated colored layer with two colors in a frame part surrounding a display area without being provided with a black matrix, and said second substrate is provided with a conductive film formed in a region which is opposed to said laminated colored layer with two colors, between said display area and said laminated colored layer with three colors.

2. An active matrix liquid crystal display device comprising:
    a liquid crystal display panel operating in a normally black mode including a first substrate provided with a color filter and a second substrate provided with an active matrix array,
    wherein said first substrate is provided with a laminated colored layer with three colors and a laminated colored layer with two colors in a frame part surrounding a display area without being provided with a black matrix, and said second substrate is provided with a conducting film formed in a region which is opposed to a boundary part between said display area and said laminated colored layer with two colors, and a boundary part between said laminated colored layer with three colors and said laminated colored layer with two colors.

* * * * *